United States Patent [19]

DeMartino et al.

[11] 4,031,307
[45] June 21, 1977

[54] CATIONIC POLYGALACTOMANNAN COMPOSITIONS

[75] Inventors: Ronald N. DeMartino, Wayne; Anthony B. Conciatori, Chatham, both of N.J.

[73] Assignee: Celanese Corporation, New York, N.Y.

[22] Filed: May 3, 1976

[21] Appl. No.: 682,286

[52] U.S. Cl. .................................. 536/114; 106/29; 252/8.55 C; 252/8.5 C; 252/8.6; 536/120
[51] Int. Cl.² ......................................... C08B 37/00
[58] Field of Search ............................... 536/1, 114

[56] References Cited

UNITED STATES PATENTS

| | | | |
|---|---|---|---|
| 3,423,395 | 1/1969 | Quimby et al. | 536/1 |
| 3,632,570 | 1/1972 | Gill | 536/1 |

*Primary Examiner*—Johnnie R. Brown

[57] ABSTRACT

This invention provides novel quaternary ammonium ethers of polygalactomannan having a degree of substitution between about 0.01 and 3.0, and further provides a process for producing quaternary ammonium ethers of polygalactomannan gums by contacting solid polygalactomannan gum with a haloalkyl-substituted quaternary ammonium compound under alkaline conditions in an aqueous solution of water-miscible solvent.

3 Claims, No Drawings

CATIONIC POLYGALACTOMANNAN COMPOSITIONS

BACKGROUND OF THE INVENTION

The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galatose branching takes place by means of a 1–6 linkage on alternate mannose units. The ratio of galactose to mannose units in the guar polymer is, therefore, one to two. Guar gum has a molecular weight of about 220,000.

Locust bean gum is also a polygalactomannan gum of similar molecular structure in which the ratio of glactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 and 4000 centipoises at 25° C using a Brookfield Viscometer Model LVF, spindle No. 2 at 6 rpm. For example, it is desirable that a gum which functions as a protective colloid or gelling agent in oil well drilling mud compositions and oil well fracturing compositions exhibit a degree of solution stability and heat stability under operating conditions.

Further, solutions of ordinary hydrocolloid gums are not sufficiently stable under variable conditions of pH and temperature or not sufficiently stable in the presence of polyvalent metal ions to qualify for general application in the textile industry for sizing, printing and finishing operations, or in the paper industry as sizing and coating agents. Also, ordinary hydrocolloid gums are susceptible to bacterial degradation.

Accordingly, it is a main object of the present invention to provide hydrocolloid gums having improved properties for applications in petroleum, textile, printing and paper industries.

It is another object of the present invention to provide guar gum and locust bean gum compositions containing quaternary ammonium ether substituents.

It is a further object of the present invention to provide cationic guar gum and locust bean gum compositions which are superior in solution stability and heat stability and are bacteriostatic in comparison with unmodified guar gum and locust bean gum.

Other objects and advantages shall become apparent from the following description and examples.

DESCRIPTION OF THE INVENTION

One or more objects of the present invention are accomplished by the provision of a process for producing cationic derivatives of polygalactomannan gums which comprises contact of solid polygalactomannan gum with a haloalkyl-substituted quaternary ammonium compound under alkaline conditions in a reaction medium comprising an aqueous solution of water-miscible solvent, wherein said quaternary ammonium compound corresponds to the formula:

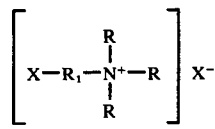

wherein R is an alkyl group containing between one and about six carbon atoms, $R_1$ is an alkylene group containing between one and about six carbon atoms, and X is chlorine or bromine.

The invention process is illustrated by the following schematic representation of the reaction between guar gum and 4-chloro-2-butenyl trimethylammonium chloride:

Whenever the following description refers specifically to guar gum, it is understood that the disclosure is applicable to other closely related polygalactomannan gums in general, and locust bean gum in particular.

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxy sites have been substituted with quaternary ammonium ether groups.

The etherification processes of the present invention are applicable to polygalactomannan gums in the form of finely divided powders or in the form of gum "splits".

Guar gum and other polygalactomannan hydrocolloids are derived from certain seeds of the plant family "leguminosae." The seeds are composed of a pair of tough, non-brittle endosperm sections referred to as "splits", between which is sandwiched a brittle embryo layer. The entire structure is enclosed in a tough seed coat.

The endosperm splits are extremely tough and nonbrittle. This renders them difficult to reduce into a finely divided state. One method of separating the endosperm splits is described in U.S. Pat. No. 3,132,681. Methods of reducing endosperm splits into finely divided powder are described in U.S. Pat. No. 2,891,050; U.S. Pat. No. 3,455,899; and references cited therein.

In a preferred embodiment of the present invention, cationic derivatives of guar gum or locust bean gum are prepared by contacting solid guar gum or locust bean gum with a haloalkyl-substituted quaternary ammonium compound and a stoichiometric excess of alkali metal hydroxide or ammonium hydroxide in a reaction medium comprising an aqueous solution of water-miscible solvent, at a temperature between about 10° C and 100° C for a reaction period sufficient to achieve a degree of substitution by quaternary ammonium ether groups between about 0.01 and 3.0.

The solid guar gum or other polygalactomannan which is etherified can be in the form of endosperm splits or in the form of finely divided powder which is derived from the endosperm splits. It is an important feature of the present invention process that the polygalactomannan gum being etherified with quaternary ammonium groups remains as a solid phase in the reaction medium during the reaction period.

In the haloalkyl-substituted quaternary ammonium compound which corresponds to the formula:

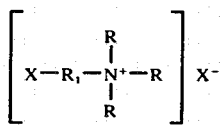

R can be alkyl groups such as methyl, ethyl, pentenyl, hexyl, and the like; and two of the R groups can be joined to form a cyclic structure such as cyclopropyl, cyclopentyl, and cyclohexyl. R is preferably a methyl or ethyl group. $R_1$ can be alkylene or alkenylene groups such as methylene, ethylene, propylene, butenylene, hexylene, and the like. $R_1$ is preferably a divalent hydrocarbyl group containing between one and about four carbon atoms.

The haloalkyl-substituted quaternary ammonium compounds can be prepared by reacting equimolar quantities of an appropriate dihalocarbon with a tertiary amine or salt thereof:

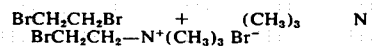

The quaternization reaction can be conducted in an aqueous system at moderate temperatures preferably with agitation until formation of the product is completed.

In the invention process for production of cationic derivatives of polygalactomannan gums, the quantity of haloalkyl-substituted quaternary ammonium reactant employed is by the degree of substitution which it is desirable to achieve in the final cationic gum derivative. For example, the etherification of five parts by weight of guar gum with one part by weight of 4-chloro-2-butenyl trimethylammonium chloride nominally yields guar gum ether having a 0.07 degree of substitution. A higher relative weight ratio of haloalkyl-substituted quaternary ammonium galactomannan gum yields a higher degree of substitution. Generally, the preferred degree of substitution is in the range between about 0.05 and 2.5.

In the preferred embodiment of the invention process described above, the etherification reaction between guar gum or locust gum and haloalkyl-substituted quaternary ammonium hydroxide performs both as a reactant and as a catalyst. The etherification reaction is catalyzed by the presence of excess alkali metal or ammonium hydroxide. This excess of hydroxide component which functions as a catalyst can vary in quantity between about 0.05 and 20 weight percent, based on the weight of polygalactomannan gum utilized.

The invention process is conducted in a two-phase reaction system comprising an aqueous solution of water-miscible solvent and water-soluble reactants in contact with solid polygalactomannan gum. The water content of the water-miscible solvent can vary in quantity between about 10 and 60 weight percent, depending on the particular solvent of choice. If more than optimum quantity of water is present in the reaction system, then the polygalactomannan gum may swell or enter into solution, thereby complicating product recovery and purification.

The water-miscible solvent is introduced into the reaction system in an amount sufficient for the preparation of a dispersion of polygalactomannan gum which can be agitated and pumped. The weight ratio of water-miscible solvent to polygalactomannan can vary in the range between about 1.0 and 10 to 1, and preferably in the range between about 1.5 and 5 to 1.

Suitable water-miscible solvents for suspension of polygalactomannan gum in the invention process include alkanols, glycols, cyclic and acylic alkyl ethers, alkanones, dialkylformamide, and the like, and mixtures thereof. Illustrative of suitable water-miscible solvents are methanol, ethanol, isopropanol, secondary pentanol, ethyleneglycol, acetone, methylethylketone, diethylketone, tetrahydrofuran, dioxane and dimethylformamide.

The invention process for introducing quaternary ammonium ether groups into polygalactomannan gums is conducted at a temperature in the range between about 10° C and 100° C and preferably in the range between about 20° C and 60° C. For convenience, the process can be conducted at ambient temperature. The reaction time can be varied in the range between about 1 and 5 hours, and preferably in the range between about 2 and 4 hours.

The invention process can be conducted in either open or closed vessels equipped with stirrers in batch or continuous operation.

After the completion of the etherification reaction, the solid polygalactomannan ether product is separated from the fluid reaction medium by centrifugation or filtration. The solid product so recovered is preferably further treated and purified by washing with the same water-miscible solvent as previously employed in the process, and then by further washing with a more anhydrous form of the same solvent. It is preferred that the product mixture from the process be neutralized with an acid before the procedure of solvent washes. Acetic acid or other organic acid is advantageous for the neutralization step since it does not increase the ash content of the polygalactomannan ether product.

In comparison to the corresponding polygalactomannan gums from which the quaternary ammonium ether derivatives are synthesized, the present invention hydrocolloid products have a lower viscosity, a greater degree of clarity, and are more stable under extreme conditions of pH and in the presence of polyvalent metal ions.

The invention hydrocolloid products are superior to conventional gums for application in petroluem, textile, printing and paper industries.

The following examples are further illustrative of the present invention. The reactants and other specific ingredients are presented as being typical, and various modifications can be derived in view of the foregoing disclosure within the scope of the invention.

EXAMPLE I

Purification of Guar Gum

Guar gum is extracted with methanol to remove methanol-soluble oils. The guar gum so treated is wetted with isopropanol, then sufficient water is added slowly to form a 0.05% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in a Wiley mill through a 40 mesh screen.

The purified guar gum powder has less than 0.1% nitrogen content, and about 0.48% ash content. For the purposes of the present invention, the quaternary ammonium ether derivatives can be produced from either the purified or unpurified guar gum.

EXAMPLE II

| Preparation Of Polygalactomannan Ethers | | | | |
|---|---|---|---|---|
| Formulation reference | A | B | C | D |
| 50% Isopropanol | 1800 mls | 1800 mls | 1800 mls | 1800 mls |
| Guar gum | 300 grams | — | 300 grams | — |
| Locust bean gum | — | 300 grams | — | 300 grams |
| 50% Sodium hydroxide | 36 grams | 36 grams | 72 grams | 72 grams |
| 4-chloro-2-butenyl trimethylammonium chloride | 75 grams | 75 grams | 150 grams | 150 grams |
| Degree of Substitution | 0.12 | 0.12 | 0.24 | 0.24 |

The polygalactomannan gum is slurried in the isopropanol solution, then heated to 40° C and purged for one hour with nitrogen. The caustic solution is added to the slurry, and the mixture is stirred for ten minutes.

The 4-chloro-2-butenyl trimethylammonium chloride reactant is added to the mixture, and the etherification reaction is conducted at 40° C over a period of four hours. The reaction mixture is neutralized to a pH of 8.3 with acetic acid, then filtered, washed twice with 50% isopropanol and once with 100% ispropanol. The polygalactomannan ether product is recovered and air-dried.

In comparison with the corresponding polygalactomannan gum starting materials, the polygalactomannan ether derivatives hydrate faster and reach peak viscosity more quickly. Also, the higher the degree of substitution of quaternary ammonium ether groups in the polygalactomannan ether derivatives, the greater the stability under varying conditions of pH and temperature. The polygalactomannan ether derivatives of the present invention have the further advantages of improved solution stability and resistance to bacterial degradation.

A guar gum ether derivative produced in accordance with Formulation A hereinabove has a degree of substitution of 0.12. A 1% aqueous solution of this ether derivative, after standing at 25° C for 24 hours, has a viscosity of 2360 CPS.

EXAMPLE III

Solution Stability Evaluation

One percent aqueous solution of cationic 4-(trimethylammonium chloride)-2-butenyl guar ether (D.S. of 0.12) and commercial guar gum are prepared, and the solution viscosities (CPS) are measured on a daily basis.

| Days | Guar | Cationic Guar |
|---|---|---|
| 1 | 4530 | 2360 |
| 2 | 4150 | 2700 |
| 3 | 2700 | 3040 |
| 4 | 1170 | 3290 |
| 5 | 640 | 3560 |
| 6 | 450 | 3430 |
| 7 | 240 | 3630 |
| 8 | 20 | 3680 |
| 9 | — | 3715 |
| 43 | — | 4030 |

These viscosity evaluation results demonstrate that an invention quaternary ammonium ether of polygalactomannan gum has superior solution stability in comparison to commercial guar gum.

EXAMPLE IV

Bacterial Stability Evaluation

One percent aqueous solution of cationic 4-(trimethylammonium chloride)-2-butenyl guar ether (D.S. of 0.12) and commercial guar are prepared, and innoculated with a bacterial preparation isolated from spoiled guar. The solution viscosities (CPS) are measured on an hourly basis.

| Time | Guar | Cationic Guar |
|---|---|---|
| 0 | 4230 | 2250 |
| 1 Hour | 3970 | 2250 |
| 2 Hours | 3030 | 2250 |
| 3 Hours | 2720 | 2250 |
| 4 Hours | 2360 | 2250 |
| 1 Day | 520 | 2280 |

These test results demonstrate that an invention cationic guar composition is bacteriostatic in comparison to commercial guar gum. The said cationic guar composition in solution is stable to degradation in the presence of bacteria.

What is claimed is:

1. 4-(Trimethylammonium chloride)-2-butenyl ethers of guar gum having a degree of substitution between about 0.01 and 3.0.

2. 4-(Trimethylammonium chloride)-2-butenyl ethers of locust bean gum having a degree of substitution between about b 0.01 and 3.0.

3. Quaternary ammonium ethers of polygalactomannan gum having a degree of substitution between about 0.01 and 3, wherein the quaternary ammonium ether substituents correspond to the formula:

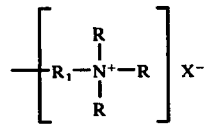

wherein R is an alkyl group containing between one and about six carbon atoms, $R_1$ is an alkylene or alkenylene group containing between one and about six carbon atoms, and X is chlorine or bromine.

* * * * *